Figure 1:
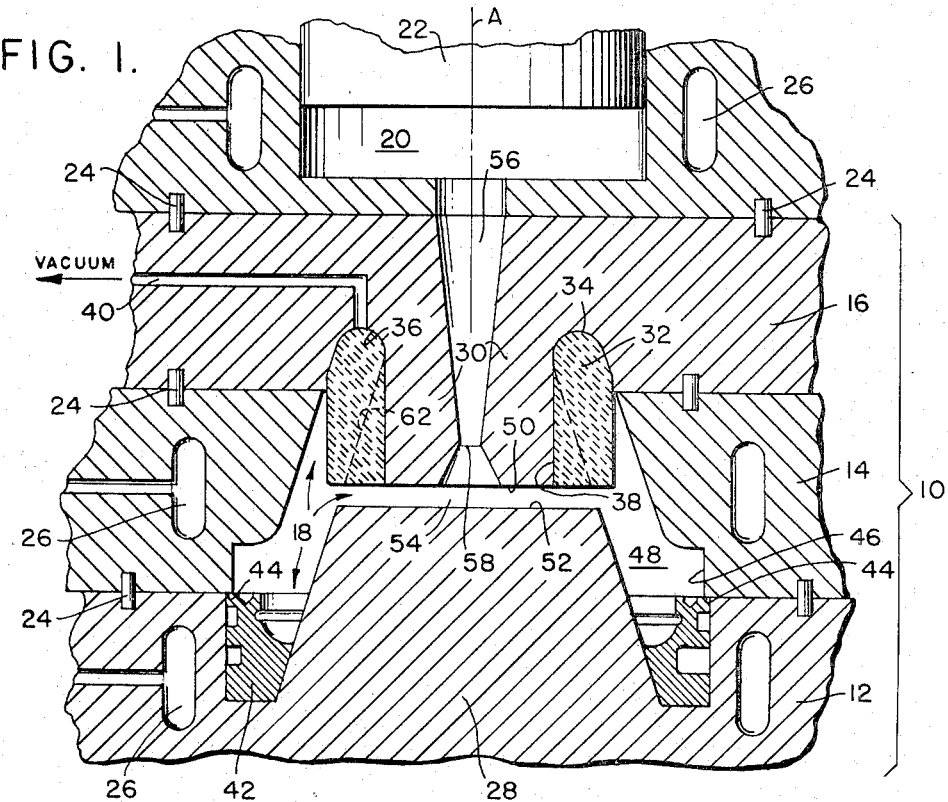

Nov. 7, 1967        P. B. WILFORD        3,351,691
NOZZLE ASSEMBLY AND METHOD OF MOLDING SAME
Filed Aug. 20, 1963

INVENTOR.
PAUL B. WILFORD
BY
ATTORNEY.

United States Patent Office 3,351,691
Patented Nov. 7, 1967

3,351,691
NOZZLE ASSEMBLY AND METHOD OF
MOLDING SAME
Paul B. Wilford, Long Beach, Calif., assignor to the
United States of America as represented by the Secretary of the Navy
Filed Aug. 20, 1963, Ser. No. 303,455
3 Claims. (Cl. 264—90)

The invention described herein may be manufactured and used by or for the Government of the United States of America for governmental purposes without the payment of any royalties thereon or therefor.

This invention relates to a technique for fabricating a rocket nozzle assembly by a molding operation. The improvement of the present invention relates more particularly to a process and apparatus for molding a nozzle assembly of thermosetting plastic material in large quantities. The invention also relates generally to improved nozzle and rupturable nozzle diaphragm apparatus and a novel nozzle and rupturable nozzle diaphragm article of manufacture.

For purposes of this specification a "thermosetting plastic material" is a plastic that is permanently hardened by raising its temperature above the temperature at which it is molten. "Molding" is defined as a general term encompassing all forms of operations in which a thermoplastic material is confined in a mold as it hardens; "casting" is that type of molding operation in which the molding material is simply flowed into the mold cavity and not subjected to any appreciable pressure as it hardens, as distinguished from production quantity types of molding operation in which high pressure is applied to the plastic as it hardens; and a "molded insert" is a member of non-plastic material integrally incorporated into a molded assembly during the molding operation. A "rupturable nozzle diaphragm" is a closure disposed across a nozzle opening in the prefired condition of a rocket, which produces cooperation in the starting of the rocket by momentarily maintaining the interior of the rocket pressure tight as it is ignited. Also, it prevents entry of moisture into the rocket.

Prior to the present invention, high fabrication costs have been a serious problem in making rocket nozzle assemblies of thermosetting plastic materials. Although little difficulty is experienced in casting such parts, a casting operation is inherently subject to the well known inconveniences of baking the molds in ovens for periods in excess of 24 hours, and therefore are not generally suited for high quantity production requirements. Molding operations where large quantities of a part are to be formed are generally distinguishable from a casting operation by the application of high pressure, along with the heat, to the molten material as it hardens in the mold. Also in molding operations intended for large quantity production, a mold must be made of conveniently separable mold sections for quick removal of the molded part. The application of pressure greatly reduces the heating period. For example, the same material that required a heating period in excess of 24 hours in a casting operation, may when molded under 1000 p.s.i. pressure require a heating period of only 30 minutes. The required heating period varies in an inverse relationship to the molding pressure. Examples of such production quantity molding operation that employ molding during hardening include forms of molding known in the art as a "transfer molding" and "injection molding," where the equipment for the latter is modified to apply the necessary heat.

Molding rocket nozzles under high pressure, and with conveniently separable mold sections, presents difficulties because of the problems in making a mold that meets the exacting and critical requirement imposed by the high fluid pressures involved. For example, the molten plastic is maintained in the mold cavity under the molding pressures in the order of at least 1000 pounds per square inch, and failure to maintain precise engagement of die portions and to form sufficiently rugged die sections can result in spoiling production parts or costly damage to the die. On the other hand, a rocket nozzle assembly is an inherently difficult object to mold. The nozzle opening, with its expanding cross section, requires the use of molds containing complex core member arrangements to shape the inside of the nozzle opening. Core members are difficult to provide in separable molds and create problems in removal of the molded part from the mold. The problem is further aggravated by the need for integrally incorporating an erosion resistant member of non-plastic material as a molded insert positioned in the nozzle opening, and a metallic attachment ring as a molded insert positioned in the outer periphery. In order to mold such inserts in position, the mold must provide exacting support cooperation to maintain them in place against possibility of movement under the tremendous fluid forces acting in the mold cavity. Lacking a large quantity production method or technique for overcoming the combination of these difficulties, it heretofore has been necessary to mold only a sub-assembly unit that is not in a form complete for attachment to the rocket, and to them assemble the completed form of the nozzle by a subsequent stage of fabrication. It therefore has been a continuing, but heretofore unobtained objective to provide a high quantity production method for molding a nozzle assembly as an integral unit which is complete for attachment to the rocket.

With the prior art practice of molding only a sub-assembly, the complete assembly was then fabricated by hand bonding. For example, where the molded unit did not contain an attachment ring, the molded unit and the metallic ring was joined by the steps of manually coating the parts with the bonding agent, manually fitting the parts together, clamping them under with predetermined pressure, and baking the clamped assembly in the oven. Furthermore, the surfaces to be joined by this operation must be originally formed with great precision to provide an accurate fit. Thus, in fabricating nozzle assemblies, in large quantities, the simplification in number and kinds of stages of fabrication, and the elimination of tedious manual operations has been a continuing objective.

Regardless of the technique of fabrication used to make a nozzle, it is necessary at some time in the assembly of the rocket to place a rupturable nozzle diaphragm in the nozzle passage. In one instance in the prior art casting practice it has been suggested that the diaphragm might be formed as an integral portion of the molded part, as examplified by U.S. Patent 3,048,970 to S. H. Herzog. It would appear, however, that if this were feasible considerable removal of material would be required in shaping the diaphragm after casting. In another prior art technique, a diaphragm of aluminum was integrally incorporated into molded sub-assembly unit as a molded insert by a transfer mold operation.

The invention is in some respects a modification and extension of some of the principles and techniques disclosed in the above identified patent. Accordingly, the objectives of the present invention include provision of:

(1) An improved method for fabricating a rocket nozzle assembly as an integral molded unit which requires only a minor finishing operation to form a nozzle device complete for attachment to the rocket.

(2) A method in accordance with the preceding objective in which the molding operation may be implemented by large quantity production molding techniques.

(3) An improved rocket nozzle and rupturable nozzle diaphragm apparatus.

(4) A novel nozzle and rupturable nozzle diaphragm article of manufacture.

5) A simplified method for fabricating a rocket nozzle assembly, which is appreciably less expensive than heretofore possible with prior art practices.

Figure 2:
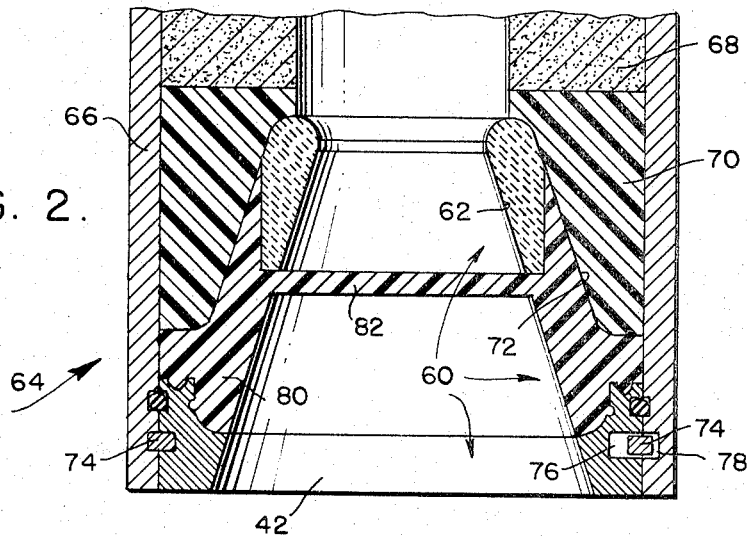

Other objects and many of the attendant advantages of this invention will be readily appreciated as the same becomes better understood by reference to the following detailed description when considered in connection with the accompanying drawings wherein:

FIG. 1 is a vertical section showing a mold and certain members to be incorporated as inserts of the part to be formed by the mold, and FIG. 2 is a longitudinal section of a rocket nozzle assembly fabricated from a unit molded in the mold of FIG. 1, the nozzle assembly being shown secured in place in a rocket.

Referring to the drawing and in particular to FIG. 1, a set 10 of mold dies for forming a semi-finished rocket nozzle unit comprises separable lower, intermediate and upper mold sections 12, 14 and 16. These mold sections form a mold cavity 18 composed of several discretely shaped cavity sections to be later identified. For present purposes, it is sufficient to state that the composite shape of mold cavity 18 is a body of revolutions formed about a central axis A. A chamber 20 and a plunger 22 form a feed press for introducing molten plastic into the mold cavity 18 and then applying pressure to the plastic while confined in the mold cavity. Such press arrangements are conventional in transfer molding. The mold section and the feed press are vertically aligned by suitable dowels and guide holes 24. Heating channels 26 are provided in the individual mold sections.

A lower frustoconically shaped core member 28 is formed as a portion of lower mold section 12, and an upper cylindrically shaped core member 30 is formed as a portion of upper mold section 16. Disposed about upper core member 30 is an annularly shaped nozzle throat insert member 32 of erosion resistant material such as graphite. This insert member is not affixed to the mold, but will instead form a part of the molded unit. One end of insert 32 is shaped to form a generally rounded end surface 34, and a matching annular recess 36 is formed in mold member 16 to seat same. The inner surface 38 of nozzle throat insert 32 is adapted to engage core member 30 with a sliding fit. A suitable suction channel 40 opens into annular recess 36 to hold nozzle insert 32 in place against the force of gravity prior to introduction of molding material into the cavity. Disposed in the bottom of mold cavity 18 is a metallic attachment ring insert 42 also intended to form a part of the molded unit. A shoulder 44 (greatly exaggerated in FIG. 1) is formed by slightly insetting the portion 46 of the cavity wall formed by intermediate mold section 14, in order to provide clamping cooperation with the bottom of the mold cavity to rigidly clamp the attachment ring insert in place during molding. Cavity wall portion 46 and the frustoconical surface of core member 28 define an annular cavity section 48 disposed between nozzle throat insert 32 and attachment ring insert 42. The end face 50 of core member 30 and the end face 52 of core member 28 are separated by a predetermined distance in order to define a thin radially extending cavity section 54, which joins annular cavity section 48 at its outer edge. A sprue passage 56 is provided through core member 30 and is centrally aligned along axis A. Sprue passage 56 communicates molten material from feed press chamber 20 to cavity 54 at its center, and is provided with a narrowed shear zone 58 adjacent the point where it joins cavity 54.

Again referring to FIG. 1, the method of molding and finishing a rocket nozzle in accordance with the present invention will now be explained. A charge of thermosettable plastic is melted in feed press chamber 20 and plunger 22 is actuated to introduce the molten plastic into mold cavity 18. The molten plastic flows through sprue passage 56 and thence radially outwardly through cavity 54, and in turn into annular cavity 48. When all portions of the mold cavity are filled with molten material, further force is applied to plunger 22 placing the molten material in the mold under a predetermined pressure and a heating fluid medium is circulated through heating channels 26 to elevate the temperature of the plastic material to the predetermined temperature at which the plastic hardens. Such predetermined pressure, which is in the order of 1000 pounds per square inch and above, and such predetermined temperature are maintained for a predetermined period of time in the order of 30 minutes, until the plastic material is hardened and cured. During this period, attachment ring insert 42 is rigidly held in place by clamping cooperation of the mold members and the nozzle throat insert 32 is held in place by the fluid pressure of the molding material. After the plastic material has hardened, inserts 32 and 42, and the material in cavities 48 and 54 become an integrally molded unit (not shown) with the inserts moldingly bonded in place. Then the mold sections are separated, the molded unit remaining attached to upper mold section 12 because the plastic material in sprue passage 56 remains integrally connected. The molded unit is disconnected by pulling it from mold member 12. The material in sprue passage 56 breaks at shear zone 58, and since a sliding fit exists at the interface between inner surface 38 of insert member 32 and core member 30, the molded unit may be easily removed from around the core member. The molded unit is then formed into the finished rocket nozzle assembly 60, FIG. 2, by shaping the inner surface 62 (dotted line in FIG. 1 and solid line in FIG. 2) of the opening through erosion resistant member 32 to the desired nozzle passage configuration. This shaping may be done by any suitable machining operation, as by means of grinding or cutting tools. Attachment ring member 42 and nozzle throat insert member 32 are contained in the molded unit in a precisely concentrically aligned relationship. Thus the attachment ring may serve a secondary role of providing a reference surface by which the molded unit may be held as the work piece in the machine tool. Any "button" or small amount of material left on the molded unit where it had been connected to the material in the sprue passage 56 may also be readily removed in the final machining operation.

FIG. 2 shows a specific use of a finished nozzle assembly 60 in the rear of a rocket 64 formed by an outer casing tube 66 and containing a hollow solid propellant grain 68. Disposed between the rear end of grain 68 and nozzle assembly 60 is an inhibitor member 70. The rear surface of inhibitor member 70 is shaped to conform to the shape of the frontal surface 72 of nozzle assembly 60. Inhibitor member 70 is cast in place in tube 66 before nozzle assembly 60 is secured in place, and is made of a slightly compressible inhibitor material, such as Thiokol having a hardness of approximately "40 Shore," as measured by a hardness measuring instrument. Nozzle assembly 60 is locked in place in tube 66 by a locking ring arrangement consisting of an expansion ring 74 disposed in the space formed by a circular groove 76 formed in the outer surface of attachment ring member 42 and a cooperating groove 78 formed in the inner surface of tube 66. The locking ring and associated grooves are so constructed and arranged that nozzle assembly 60 is locked in place with its frontal surface 72 exerting a predetermined compressive force against inhibitor member 70. This places the inhibitor member under a slight compressive strain, providing a tight seal to gases during combustion of propellant grain 68.

It is to be noted that the plastic material which was confined in annular cavity section 48 (FIG. 1) during molding forms an intermediate annular portion 80 (FIG. 2, only) of nozzle assembly 60 which joins the nozzle throat member 32 and the attachment ring member 42. The plastic material confined in radial cavity section 54 (FIG. 1) during molding forms an integral rupturable nozzle diaphragm portion 82 (FIG. 2, only). The thickness of diaphragm portion 82 is selected to rupture in response to a predetermined pressure within the rocket motor, producing the desired momentary build up of pressure in the interior of the rocket during ignition of the propellant grain. It will be apparent therefore that cavity 54 of the mold has served both as a gate passage through which the molten plastic may be introduced into annular cavity 48, and a space to form the integrally molded nozzle diaphragm.

Obviously many modifications and variations of the present invention are possible in the light of the above teachings. It is therefore to be understood that within the scope of the appended claims the invention may be practiced otherwise than as specifically described.

What is claimed is:

1. The method of making an expanding nozzle having a first annular insert of erosion resistant material at its gas entry end, a second axially spaced annular insert of larger internal diameter than the first insert forming an attachment ring at its gas exit end, an intermediate annular portion of a plastic molding material joining said inserts, said intermediate annular portion having a conical inner surface and including a portion surrounding the first insert and a transverse rupture diaphragm of a plastic molding material extending across the opening through the longitudinally intermediate portion at a position immediately adjacent the inner end face of the first annular insert, said longitudinally intermediate and transverse diaphragm portions being made of plastic having thermosetting and bonding characteristics, said method comprising the steps of:
    (1) maintaining said inserts in predetermined spaced relationship in a mold,
    (2) introducing molding material into the mold at the axis of the nozzle and thence flowing same outwardly in all radial directions through a space so shaped to form said transverse diaphragm and axially located in alignment with the inner end face of the first annular insert, and thence flowing same in opposite axial directions toward both inserts including flowing into a space surrounding the first insert,
    (3) simultaneously applying heat and appreciable pressure to the mold material to harden same and moldingly bond same to the insert,
    (4) remove the composite article from the mold,
    (5) machining the inner surface of the first annular insert to a shape forming a continuation of said conical surface.

2. A method in accordance with claim 1, and further where the method employs a plural part mold assembly comprising at least first and second confronting axial mold sections consisting of a first mold section adjacent the gas entry end of the nozzle and a second mold section adjacent the gas exit end of the nozzle; and
    (6) said method including the step of maintaining the first insert in the mold by applying a vacuum to its outer end face to maintain same in direct contact with the confronting surface of the first axial mold section.

3. A method in accordance with claim 2, wherein;
    (7) said first annular insert has an axially extending cylindrical inner surface, and is maintained in the mold with said inner surfaces in contact with the exterior of surface of an axially aligned core member coextensive with said insert and projecting axially inwardly from said first mold section.

References Cited

UNITED STATES PATENTS

| | | | |
|---|---|---|---|
| 1,254,646 | 1/1918 | Bausch | 264—162 |
| 2,668,329 | 2/1954 | Landau | 18—30 XR |
| 2,684,502 | 7/1954 | Paulve | 18—36 XR |
| 3,048,970 | 8/1962 | Herzog. | |

FOREIGN PATENTS 1,203,501  1/1960  France.

ROBERT F. WHITE, *Primary Examiner.*

T. J. CARVIS, *Assistant Examiner.*